United States Patent [19]

Bjorkman, Jr.

[11] 4,386,140
[45] May 31, 1983

[54] MULTIPLE STAGE MULTIPLE FILTER HYDRATE STORE

[75] Inventor: Harry K. Bjorkman, Jr., Birmingham, Mich.

[73] Assignee: Energy Development Associates, Inc., Madison Heights, Mich.

[21] Appl. No.: 368,892

[22] Filed: Apr. 16, 1982

[51] Int. Cl.³ .......................................... H01M 8/06
[52] U.S. Cl. ................................ 429/19; 429/51; 429/105
[58] Field of Search .................. 429/12, 15, 19, 101, 429/105, 51, 34

[56] References Cited

U.S. PATENT DOCUMENTS

| | | | |
|---|---|---|---|
| 3,713,888 | 1/1973 | Symons | 429/51 |
| 3,775,187 | 11/1973 | Bjorkman | 136/86 A |
| 3,783,027 | 1/1974 | Bjorkman | 136/86 C |
| 3,793,077 | 2/1974 | Behling | 136/6 E |
| 3,809,578 | 5/1974 | Symons | 429/51 |
| 3,814,630 | 6/1974 | Bjorkman | 429/70 |
| 3,823,036 | 7/1974 | Bjorkman, Jr. | 136/6 F |
| 3,840,650 | 10/1974 | Bjorkman | 423/462 |
| 3,907,592 | 9/1975 | Symons | 136/6 R |
| 3,908,001 | 9/1975 | Symons et al. | 423/472 |
| 3,935,024 | 1/1976 | Symons | 136/6 E |
| 3,940,283 | 2/1976 | Symons | 136/6 E |
| 3,993,502 | 11/1976 | Bjorkman et al. | 429/51 |
| 4,001,036 | 1/1977 | Berman et al. | 429/67 |
| 4,115,529 | 9/1978 | Behling | 423/472 |
| 4,146,680 | 3/1979 | Carr et al. | 429/101 |

OTHER PUBLICATIONS

"50 kW-hr Zinc-Chlorine Hydrate Battery", Peter Carr et al., (from the Proceedings of the 28th Power Sources Symposium), pp. 23-26.
"45-kWh Zinc-Chloride Load-Leveling Battery Module: Recent Performance Improvements", R. D. Clubb, et al., pp. 1-4 (from the Proceedings of the 29th Power Sources Symposium).
"Development of the Zinc-Chloride Battery for Mobile Applications", A. Lijoi, Sections 18 and 23, Dec. 1981.
"Newsweek", Jun. 16, 1980, pp. 75 and 76.
G+W News Services, "G+W Electric Engine Units Power First Practical Electric Vehicles", Jun. 5, 1980, pp. 1-7.

*Primary Examiner*—Donald L. Walton
*Attorney, Agent, or Firm*—Harness, Dickey & Pierce

[57] ABSTRACT

An improved hydrate store for a metal halogen battery system is disclosed which employs a multiple stage, multiple filter means or separating the halogen hydrate from the liquid used in forming the hydrate. The filter means is constructed in the form of three separate sections which combine to substantially cover the interior surface of the store container. Exit conduit means is provided in association with the filter means for transmitting liquid passing through the filter means to a hydrate former subsystem. The hydrate former subsystem combines the halogen gas generated during the charging of the battery system with the liquid to form the hydrate in association with the store. Relief valve means is interposed in the exit conduit means for controlling the operation of the separate sections of the filter means, such that the liquid flow through the exit conduit means from each of the separate sections is controlled in a predetermined sequence. The three separate sections of the filter means operate in three discrete stages to provide a substantially uniform liquid flow to the hydrate former subsystem during the charging of the battery system. The separation of the liquid from the hydrate causes an increase in the density of the hydrate by concentrating the hydrate along the filter means.

50 Claims, 7 Drawing Figures

MULTIPLE STAGE MULTIPLE FILTER HYDRATE STORE

The Government of the United States of America has rights in this invention pursuant to Contract No. DE-AC02-76ET20131 awarded by the U.S. Department of Energy.

BACKGROUND OF THE INVENTION

The present invention relates to improvements in metal halogen battery systems. More particularly the invention relates to a new multiple stage, multiple filter hydrate store for these battery systems.

The electrical energy storage systems of the type referred to herein (e.g., a zinc chlorine battery system or other metal-halogen battery system) utilize a halogen hydrate as the source of halogen components for reduction at a normally positive electrode, and an oxidizable metal adapted to become oxidized at a normally negative electrode during the normal discharge of the storage system. An aqueous electrolyte is employed for replenishing the supply of the halogen components as it becomes reduced at the positive electrode. The electrolyte contains the dissolved ions of the oxidized metal and the reduced halogen and is circulated between the electrode area and a storage area containing halogen hydrate, which progressively decomposes during a normal discharge of the electrical energy system, liberating additional elemental halogen to be consumed at the positive electrode.

The state of the art in electrical energy storage systems or battery systems of this type is described in the following cited references owned by the same assignee as the present invention, such as Symons U.S. Pat. No. 3,713,888 entitled "Process For Electrical Energy Using Solid Halogen Hydrates"; Symons U.S. Pat. No. 3,809,578 entitled "Process for Forming and Storing Halogen Hydrate in a Battery"; and Bjorkman U.S. Pat. No. 3,814,630 entitled "Filter/Store For Electric Energy Storage Device"; and, in commonly assigned copending Bjorkman U.S. patent application Ser. No. 358,628, filed Mar. 16, 1982, entitled "Metal Halogen Battery System With Multiple Outlet Nozzel For Hydrate."

The specific teachings of the aforementioned cited references are incorporated herein by reference. The new multiple state, multiple hydrate store disclosed herein is particularly useful for application in a battery system of the type described in the copending application referred to immediately above. However, it also has wide application for use in numerous metal halogen battery systems.

The basic operation of a zinc chloride battery system is as follows. In charge, an electrolyte pump delivers aqueous electrolyte to pockets between pairs of porous graphite-chlorine electrodes in a battery stack comprised of a plurality of cells. The electrolyte passes through the porous chlorine electrodes into a chamber between opposite polarity electrodes, flows up between the electrodes, then flows back into the battery sump. Chlorine gas liberated from porous graphite electrode substrates is pumped by a gear pump, otherwise referred to as the gas pump, and before entering the gas pump, the chlorine is mixed with electrolyte chilled by a chiller unit. The chlorine and chilled electrolyte are mixed in the gear pump, chlorine hydrate forms in a process analogous to the water freezing process with chlorine included in the ice crystal, and the chlorine hydrate-electrolyte mixture is deposited in the store. In discharge, chlorine is liberated from the hydrate by decomposition of the chlorine hydrate in the store in a process analogous to the melting of ice, by injection of warm electrolyte for the sump. On development of the required chlorine gas pressure in the store, the chlorine is injected and mixed with and dissolved in the electrolyte, which is then fed to the porous electrodes in the battery stack. The battery stack is then discharged, wherein the electrode dissolution of zinc occurs at the zinc electrode, reduction of the dissolved chlorine occurs at the chlorine electrode, power is available from the battery terminals, and zinc chloride is formed in the electrolyte by reaction of zinc and chlorine to form zinc chloride.

Further discussion of the structure and operation of zinc chloride battery system may be found in commonly assigned copending U.S. patent applications of Fong et al., Ser. No. 310,627, filed Oct. 13, 1981, entitled "Metal Halogen Battery Construction With Improved Tehchnique For Producing Halogen Hydrate"; of Kiwalle et al., Ser. No. 343,904, filed Jan. 29, 1982, entitled "Metal Halogen Battery System," and of Hacha, Ser. No. 357,742, filed Mar. 12, 1982, entitled "Halogen Hydrate Storage Device for Mobile Zinc-Chloride Battery Systems." Such systems are also described in published reports prepared by the assignee herein, such as "Development of the Zinc-Chloride Battery for Utility Applications," Interim Report EM-1417, May 1980, and "Development of the Zinc-Chloride Battery for Utility Applications," Interim Report EM-1051, April 1979, both prepared for the Electric Power Research Institute, Palo Alto, Calif. The specific teachings of the aforementioned cited references are incorporated herein by reference.

During the development of the zinc-chloride battery system, several single stage filter designs for use in the hydrate store have been tested, including a rectangular filter across the top of the store, an L-shape filter across one side and the bottom of the store, a combination of these two filters in a single stage, a basket-type filter seated in the store, and a bag like filter substantially overlying the interior walls of the store (as described in U.S. Pat. No. 3,814,630). The purpose of the filter in the hydrate store is to separate the compressible particulate chlorine hydrate from the liquid used in the hydrate formation process. As the chloride hydrate enters the store, it is in the form of a dilute slurry, of which approximately seven (7) percent is hydrate crystal. However, due to the amount of chlorine gas which is liberated during the charging of the battery, it is not practical to store the chlorine hydrate particles in this dilute slurry. Accordingly, a filter is used to provide a hydrate consentration system for removing as much of the excess liquid as possible. It will be appreciated that the increase in the density of the hydrate particles in the store will result in a decrease in the size and weight of the battery system. This advantageous result is particularly important where the battery system is employed in a battery-powered vehicle.

Accordingly, it is a principal object of the present invention to provide a multiple stage, multiple filter hydrate store for a zinc-chloride battery system which more effectively concentrates the chlorine hydrate particles during the charging of the battery system.

It is a more specific object of the present invention to provide a hydrate store filter design having three separate sections and which operates in three discrete stages to achieve a substantially uniform liquid flow through the store during the charging of the battery system while maintaining a hydraulically compressive load on the hydrate.

It is an additional object of the present invention to provide a multiple stage, multiple filter hydrate store filtration or hydrate concentration system which is adapted to maintain the pressure in the hydrate store within acceptable levels during the charging of the battery.

Additional advantages and features of the present invention will become apparent from a reading of the detailed description of the preferred embodiments which makes reference to the following set of drawings in which:

BRIEF DESCRIPTION OF THE DRAWINGS

FIG. 3a is a cross-sectional view of the multiple stage, multiple filter hydrate store illustrated in FIG. 1, taken generally along lines A—A of FIG. 2.

FIG. 3b is a partial plan elevation view of the interior side wall of the multiple stage, multiple filter hydrate store, taken generally along lines B—B of FIG. 3a.

FIG. 4a is a cross-sectional view of another embodiment of a multiple stage, multiple filter hydrate store according to the present invention.

FIG. 4b is an enlarged cross-sectional view of a portion of the multiple stage, multiple filter hydrate store embodiment of FIG. 4a, particularly illustrating a technique of securing the filter cloth end in a sealing relationship with the side wall of the hydrate store.

FIG. 5 is a plan elevation view, partially in cross-section, of a valve assembly for the multiple stage, multiple filter hydrate store illustrated in FIG. 1.

SUMMARY OF THE INVENTION

The invention concerns an improved hydrate store for a metal halogen battery system wherein a multiple stage, multiple filter means is employed for separating the halogen hydrate from the liquid used in forming the hydrate. The filter means is constructed in the form of three separate sections which combine to substantially cover the interior surface of the store container. Exit conduit means is provided in association with the filter means for transmitting liquid passing through the filter means to a hydrate former subsystem. The hydrate former subsystem combines the halogen gas generated during the charging of the battery system with the liquid to form the hydrate in association with the store. Relief valve means is interposed in the exit conduit means for controlling the operation of the separate sections of the filter means, such that the liquid flow through the exit conduit means from each of the separate sections is controlled in a predetermined sequence. The three separate sections of the filter means operate in three discrete stages to provide a substantially uniform liquid flow to the hydrate former subsystem during the charging of the battery system. The separation of the liquid from the hydrate causes an increase in the density of the hydrate by concentrating the hydrate along the filter means.

DESCRIPTION OF THE PREFERRED EMBODIMENTS

Filtration has been developed as a practical art rather than as a science, possibly because the large number of variables involved in any particular type of filtration result in analytical situations that can be solved more economically by experimental rather than theoretical methods (Perry's *Chemical Engineer's Handbook*, 5th Ed., McGraw-Hill, 1969, pp. 19-57-60). The use of filtration theory is limited by the fact that filtering characteristics must always be determined on the actual slurry in question, as the data obtained on one type of slurry is generally not applicable to another because of distribution and packing characteristics.

Filtration proceeds by the formation of a layer or cake of solid particles on the surface of a porous filter media. Once this layer has formed, its surface acts as the filter media. As solids are deposited, they add to the thickness of the cake and the liquid is filtered-out. The liquid passes partially through a bulky mass of particles of irregular shape and partially through small channels that tend to form in the cake.

The liquid flow through both the packed particle bed and the small channel is laminar. Therefore, the Poiseuille equation, which is the analytical expression applicable to laminar flow, is frequently used as a basis for the semi-empirical characterization of the bedflow parameters. In this instance, parameters that cannot be determined separately are collected or "lumped." The parameters that are known are then applied to the equation to extract the lumped parameters.

Applied to filtration, the Poisuille equation becomes:

$$\frac{dV}{dtA} = \frac{g_c \cdot P}{\mu \, a(W/A + r)} \tag{1}$$

where
 V = Volume of filtrate (solution)
 A = Area of filtering surface
 t = Time
 p = Total pressure drop across the filter media and the cake deposited on it
 $\mu$ = Viscosity of filtrate
 W = Mass of dry cake solids corresponding to V
 $\alpha$ = Specific cake resistance
 r = Other resistance losses in the system across which P is the pressure drop.

W is related to V by:

$$W = V\omega = \left(\frac{\rho C}{1 - mc}\right) v \tag{2}$$

where
 $\omega$ = Mass of dry cake solids per unit volume of filtrate
 $\rho$ = Density of the filtrate
 C = Mass fraction of cake solids in the slurry
 m = Mass ratio of wet cake to dry cake The symbol $\alpha$ representing the average specific resistance of the filter is a constant for the particulate cake in its immediate condition at a particular operating value of P.

The variable $\alpha$ is related to pressure P by the empirical expression:

$$\alpha = \alpha' P^S \quad (3)$$

where
- $\alpha'$ = Bed resistance coefficient, a constant determined by particle size and shape
- S = Cake compressibility, 0.0 for rigid incompressible particles and 1.0 for very highly compressible cakes If the pressure is constant, equations 1 and 2 may be combined to give $$\frac{t}{V/A} = \frac{\mu \alpha \omega}{2 g_c P}\left(\frac{V}{A}\right) + \frac{\mu r}{P} \quad (4)$$

If the provision is made to measure the pressure drop across the cake independent of the filter media, the constant r can be neglected to give:

$$t = \frac{\mu \alpha \omega}{2 g_c P}\left(\frac{V}{A}\right)^2 \quad (5)$$

Dividing both sides by $t^2$ and rearranging:

$$P = \frac{\mu \alpha \omega t}{2 g_c}\left(\frac{V}{At}\right)^2 \quad (6)$$

Substituting equation 3 into equation 6

$$P^{(1-S)} = \frac{\mu \alpha' \omega t}{2 g_c}\left(\frac{V}{At}\right)^2 \quad (7)$$

Equation 7 is a standard form used to describe continuous filtration where P is the pressure drop across the filter cake. (See, *Unit Operations of Chemical Engineering*, W. L. McCabe and J. C. Smith, McGraw-Hill, 3rd Ed., 1976, pp. 942-946). The parameters $\mu$, $\alpha'$ and $\omega$ are constants. If the volume rate of solids filtration V/t is held constant, measurements of pressure as a function of time can be sued to directly determine the apparent cake compressibility, S.

In experiments conducted to determine the characteristics of chlorine hydrate filtration, the value of the compressibility coefficient S was found to be 0.73 when water was used for the hydrate forming liquid media. This compressibility coefficient value indicates that the hydrate in the store behaves as a highly compressible filter cake. The value of the bed resistance coefficient $\alpha'$ was also found to be approximately $2.73 \times 10^5$ (cm, g, sec.). This bed resistance coefficient value indicates that within the range of hydrate concentration tested (8 to 23 percent), the chlorine hydrate cake is highly porous or channeled. These experiments supported the hypothesis that the previously achieved hydrate storage density could be increased by modifications to the means of filtration in order to take advantage of the cake porosity and compressibility.

Figure 1:
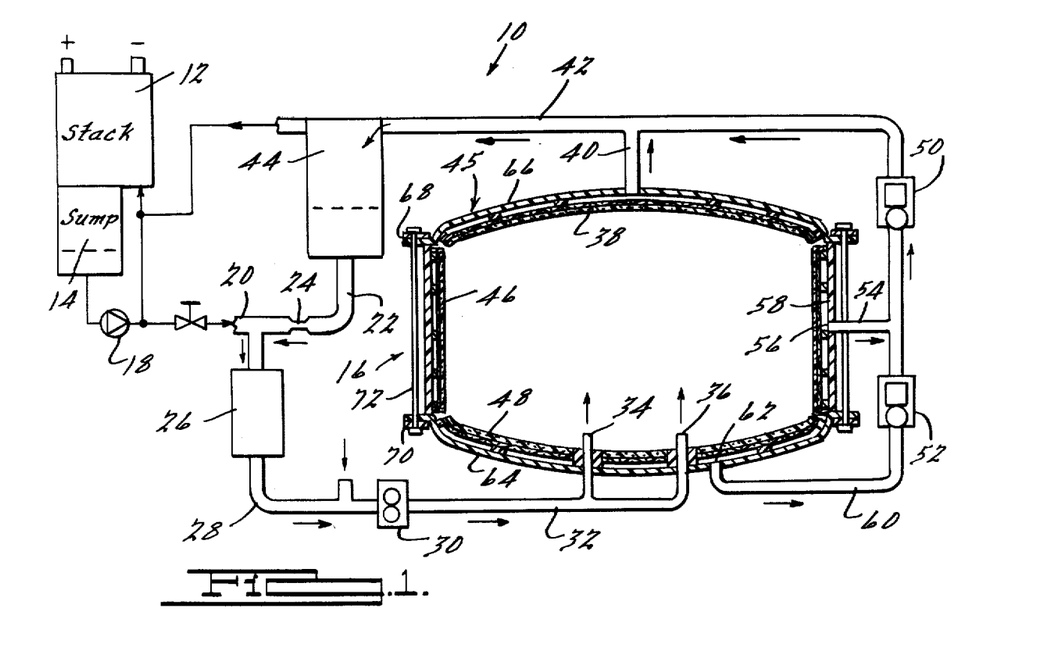
FIG. 1 is a simplified schematic of a metal halogen battery system employing the present invention, and particularly illustrating a multiple stage, multiple filter hydrate store according to the present invention.

Referring to FIG. 1, a simplified schematic of a zinc chloride battery system 10 according to the present invention is shown. The battery system 10 generally comprises a battery stack 12, a sump 14, and a hydrate store 16. The stack 12 comprises a plurality of cells each having a positive electrode and a negative electrode. The detailed description of a typical cell construction may be found in U.S. Pat. No. 4,100,332 to Peter Carr, issued July 11, 1978, assigned to the assignee of the present invention. The sump 14 comprises an electrolyte reservoir which feeds an electrolyte pump 18 used to circulate the electrolyte to all the cells in the battery stack.

During the charging of the battery system 10 chlorine gas is generated or liberated at the positive electrodes in the battery stack 12. The formation of chlorine hydrate in the battery is accomplished by mixing the chlorine gas with an aqueous liquid which has been chilled to a temperature compatible with the formation of hydrate for that liquid (typically between $-8°$ to $+6°$ C.). This liquid or hydrate forming media may be comprised of the battery electrolyte itself, water, or other suitable liquids. In battery system 10 a portion of the hydrate forming liquid is provided by the battery electrolyte via conduit 20, and the remaining portion is provided by the filtered liquid through conduit 22. Conduit 22 includes an orifice 24 which is used to regulate the flow of the liquid through the conduit. The liquid or electrolyte from conduits 20 and 22 combine and flow through a heat exchanger 26 which is used to decrease the temperature of the electrolyte to the level required for the formation of hydrate. In one form of the present invention, the heat exchanger 26 comprises a tube-shell type heat exchanger having on the order of one hundred and fifty thin wall titanium tubes arranged in parallel. A more detailed discussion of this type of heat exchanger may be found in "Development of the Zinc-Chlorine Battery for Utility Applications," Interior Report EM-1051, April, 1979, pp. 15-9, 15-10. The chlorine gas generated in the battery stack 12 is mixed with the chilled electrolyte in conduit 28, and pumped into the hydrate store 16 via a gas pump 30 conduit 32. In one form of the present invention, the gas pump 30 comprises of G-10 gear pump manufactured by Eco Pump, Corp., New Jersey. A detaled discussion of the structure and operation of the G-10 pump may be found in "Development of the Zinc Chlorine Battery for Utility Applications," Interim Report EM-1051, April, 1979, pp. 17-7, 17-8. The heat exchanger 26 and the gas pump 30 comprise the hydrate former subsystem for the battery system 10. The solution of the chilled electrolyte and the chlorine gas is mixed under turbulent conditions to form a finely divided particulate chlorine hydrate by the reaction of where x is approximately 6-8 for chlorine hydrate under normal conditions.

At the beginning of charge, the hydrate store 16 is filled with the hydrate forming liquid. Due to its density, the particulate chlorine hydrate expelled from the pump outlets 34 and 36 will normally rise through the liquid until it reaches a top filter section 38. The flow of the newly formed hydrate slurry into the store 16 will cause liquid flow through the top filter section 38 into a top intake conduit 40. The top intake conduit 40 is connected to a manifold conduit 42 which serves (as part of an exit conduit subsystem) to return the liquid used in the hydrate formation process to the heat exchanger 26 in order to the recycled. The battery system 10 also includes a liquid/gas separater 44 which permits any gas leaving the hydrate store 16 to return to the battery stack 12. As will be more fully discussed below, the hydrate filter means accordiang to the present invention is constructed so as to permit gas and liquid flow, but to prevent the particulate hydrate from escaping a store container 45.

As the charging of the battery system 10 progresses, the particulate chlorine hydrate will gradually form as a compressible cake along the top filter section 38. This filter cake will be supported in part by the upward fluid flow and by very small residual attached gas bubbles. As the thickness of this filter cake increases during charge, the pressure drop through the cake increases. The hydrate cake itself becomes a filter, and the cake will compress as the liquid attempts to find its way through the cake under the hydraulic pressure load. This will in turn decrease the pore volume available for flow, thereby adding further resistance to liquid flow and increasing the pressure drop across the hydrate cake. Although a positive pressure in the store 16 will serve to compress and compact the hydrate, at some point in the hydrate bed depth the pressure drop across the hydrate bed or cake will exceed the pratical design limits for the store container 45 and the gas pump 30. Additionally, the liquid flow through the intake conduit 40, and hence the liquid flow to the heat exchanger 26, will gradually begin to decrease as the hydrate cake becomes more resistant to liquid flow. This will, of course, affect the formation of the hydrate by upsetting the balance of liquid to gas flow. This situation is further complicated by the fact that the particle size of the hydrate is believed to be inversely proportional to the concentration of the zinc chloride electrolyte. The sizes of the hydrate particules appear to be much smaller with the 25% zinc chloride solution concentration normally employed at the beginning of the charge. Larger particle sizes occur with the 5% zinc chloride solution concentration normally encountered at the end of the charge. Accordingly, as the zinc chloride concentration in the electrolyte changes during the charge, the particle size of the hydrate will also vary. Additionally, the viscosity of the electrolyte being used to form the hydrate will also vary due to the gradually changing electrolyte concentration during the charging of the battery system.

In order to achieve advantageous results of the present invention, battery system 10 is also provided with a side section filter 46, and a bottom section filter 48. Each of the filters 38, 46 and 48 are completely separate and operate in 3 discrete stages. In the first stage only the top filter section 38 operates to concentrate the hydrate by filtering out the excess liquid. In the second stage both the top filter section 38 and the side filter section 46 are operable, and in the third stage all three of the filter sections are operable. The sequence and timing of these stages are controlled by a pair of relief valves 50 and 52 which are interposed in the manifold conduit 42. In the first stage, the excess liquid from the hydrate store 16 flows freely through the top intake conduit 40 and out to the manifold conduit 42. However, fluid flow through the side filter section 46 and the bottom filter section 48 is prevented by the pressure responsive relief valves 50 and 52. The side filter section 46 is provided with a side intake conduit 54 which has an inlet port 46 disposed in the space between the filter section and a side portion 58 of the store means container. Similarly, the bottom filter section 48 is provided with a bottom intake conduit 60 which has an inlet port 62 disposed in the space between the filter section and a bottom portion of the container. The intake conduit 54 is connected to the mainfold conduit 42 between the relief valve 50 and relieve valve 52, while the intake conduit 60 is connected to the inlet port side of the relief valve 52. The relief valve 50 is adapted to permit liquid flow through the side intake conduit 54 above a first predetermined pressure in the store means container. Similarly, the relief valve 52 operates to permit liquid flow through the bottom intake conduit 60 above a second predetermined pressure in the store means container. In one form of the present invention, the first predetermined pressure lies in a range between 2 psi to 6 psi, with a preferred pressure level of 4 psi in the store container. The second predetermined pressure also lies within a range of 3 psi to 8 psi, with a preferred pressure level of 6 psi.

In operation, the top filter section 38 cooperates with the relief valve 50 in the first stage to concentrate the hydrate along the top filter section of the filter means until the pressure in the store container rises above the first predetermined pressure. This allows compression of the hydrate on the primary or top filter section 38 until such time that the pressure rises to such a point the hydrate cake is optimumly compressed along the top filter section. In the second state the pressure responsive relief valve 50 opens to permit flow through the side intake conduit 54, thereby permitting the side filter section 46 to operate. In this stage, both the top filter section 38 and the side filter section 46 will operate to filter the excess liquid. However, the hydrate will quickly form a cake along the side filter section 46 due to the lower resistance to liquid flow. Accordingly, even though both these filter sections will be operating, the side filter section 46 will become the primary filter doing the substantial portion of the work until the cake forms and compresses to the bed depth along the top filter section 38. In the third stage, both of the relief valves 50 and 52 will open to permit liquid flow through all three of the filter section of the filtering means. However, as in the case of the second stage, the bottom filter section 48 will become the primary filter during the initial portion of the third stage. It will also be appreciated that during the third stage the manifold conduit 42 will operate to receive liquid flow from the first, second and third intake conduits, 40, 54, 60, respectively, and transmit this liquid to the hydrate forming means, that is the heat exchanger 26 and gas pump 30.

The above described operation of the hydrate store 16 achieves several advantageous results over previous single filter or single stage hydrate store designs. Firstly, the multiple stage, multiple filter hydrate store according to the present invention provides a controlled compation or compression of the hydrate in the store during the charging of the battery system. In a single stage filter design little hydrate compaction occurs until a filter cake forms along the entire filter means, whereas in battery system 10 hydrate compaction occurs very quickly along the top filter section 38. Thus, the hydrate store 16 is adapted to maintain a hydraulicly compressive load on the hydrate substantially during the entire charging of the battery system 10. Additionally, the hydrate store 16 also operates to achieve a substantially uniform liquid flow to the heat exchanger 26 during the charging of the battery system by providing for 3 separate intake conduit portions which are operable in 3 distinct stages. It will also be appreciated that this hydrate concentration system is adapted to maintain the pressure in the hydrate store within acceptable levels during the charging of the battery system 10 by providing for 2 controlled pressure relief levels.

Figure 2:
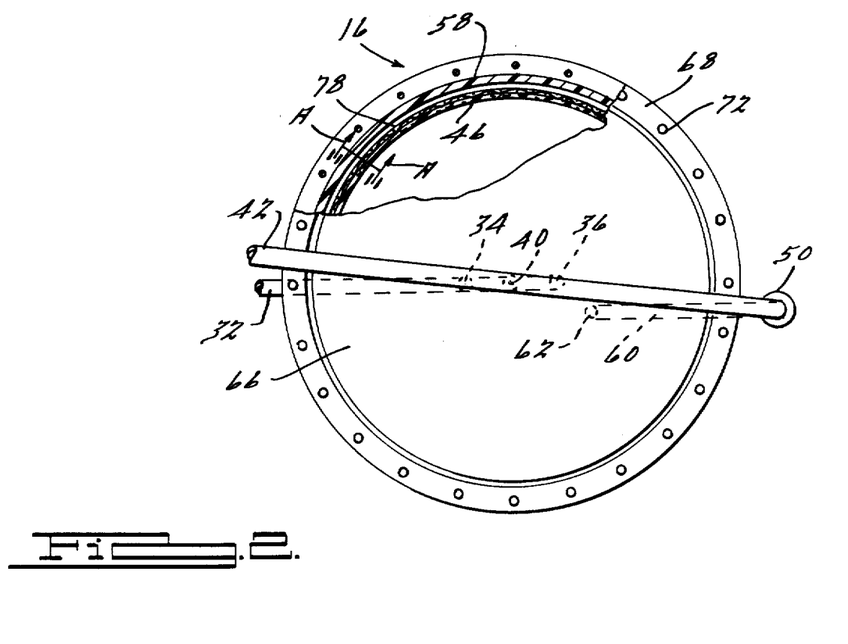
FIG. 2 is a top elevation view, partially in cross-section, of the multiple stage, multiple filter hydrate store illustrated in FIG. 1.

Turning now to FIG. 2, a top elevation view, partially in cross-section, of the hydrate store 16 is shown. As is readily apparent from this figure, the hydrate store 16 is generally cylindrical in nature. Accordingly, the store container 45 comprises the generally vertically disposed annular side portion 46, a generally horizontally disposed circular top portion 66, and a generally horizontally disposes circular bottom portion 64. As may best be seen with reference to FIG. 1, both the top portion 66 and the bottom portion 64 are deformed or bowed outwardly to reduce the effective pressure on these portions of the container 46. To prevent the escape of gas or liquid from the store container 45, both the top portion 66 and the bottom portion 64 are secured to the side portion 58 in a sealing relationship. Specifically, a pair of annular collar members 68 and 70 are employed to secure the top portion 66 and the bottom portion 64 to the side portion 58 via a plurality of elongated horizontally disposed bolts 72. However, it should be appreciated that this method of attachment is intended to be exemplary only, and that other suitable methods of attachment may be employed in the appropriate application.

Although the principles of the present invention may be applied to a variety of store container shapes, such as a spherical shape, it has been found advantageous in a cylindrical configuration to provide a predetermined geometrical relationship between the magnitude of the height of the side portion 58 of the container and the magnitude of the diameter of the top and bottom portions 66 and 64 of the container. Specifically, it is preferred that the ratio of the side portion height to the top/bottom portion diameter should be between 0.25 and 0.9. The reason for this specific geometrical relationship is derived from the packing characteristics of the chlorine hydrate. It is believed that a relatively greater side portion height with respect to the top/bottom portion diameter may lead to premature dense packing of the hydrate along that portion of the side filter section nearest to the pump outlets during the second state of operation. This situation could arise because the hydrate cake along the top filter section may form a downwardly projecting column which overlaps the upper portion of the side filter section and impedes the formation of dense hydrate on this portion of the side filter section. Since the densest packing occurs at the filter surface, excessive side portion container heights may result in non-uniform hydrate formation and packing along the side filter section of the filter means. It should also be noted that the heat exchanger 26, the gas pump 30, and the relief valves 50 and 52 are all disposed outside the hydrate store container 45. This is intended to reduce any interference with the packing of the hydrate within the store container 45. However, these components may also be suitably disposed within the container 45 in the appropriate application.

Figures 3A, 3B, 4A, 4B, 5:
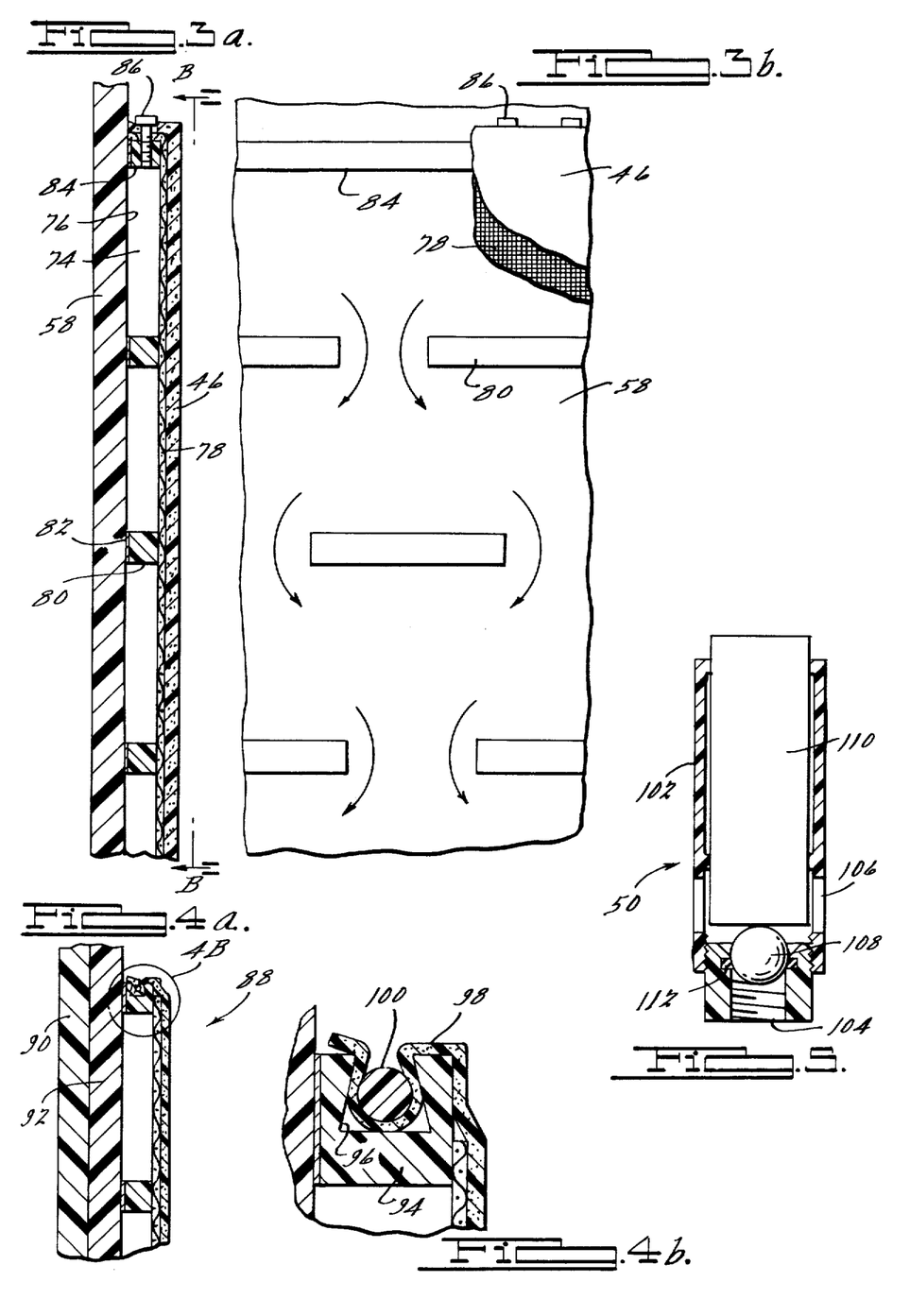

Referring to FIG. 3a, a cross-sectional view of the hydrate store 16 is illustrated, the section being taken generally along line AA of FIG. 2. FIG. 3a particularly illustrates a space 74 between the side section filter 46 and an interior surface 76 of the side portion 58 of the container 45. The filter section 46 is supported by a screen 78 which has a plurality of perforations therethrough to permit liquid flow from the interior of the store 16 to the space 74. A plurality of spacer bars 80 provide a predetermined distance between the screen 78 and the interior surface 76 of the side portion 58. The relative length of the spacer bars 80 may best be seen with reference to FIG. 3b, which is a partial plan elevation view of the interior side portion of the store container 45. The arrows in FIG. 3b indicate that the liquid flow through the side filter section 46 travels vertically around the spacer bars 80 toward the side intake conduit 54. The spacer bars 80 may be cemented, welded or otherwise conventionally secured to the side portion 58 of the container 45 (at reference numeral 80), depending upon the materials used for the container and the spacer bars. The predetermined distance provided by the spacer bars 80 is preferably between ⅛th and ¼th inches, but this distance may be varied so long as a sufficient distance is provided to permit the necessary gas and liquid flow in the space 74.

As illustrated in FIGS. 1, 3a and 3b, the filter sections 38, 46 and 48 combine to substantially cover the interior surface of the container 45, and it is preferred that the space between the filter sections be minimized in order to provide as much filter surface area as possible within the store container. Each of the filter sections are secured to their respective container portions around the periphery thereof in a particle-tight sealing relationship. It should be appreciated that a gas tight or liquid tight seal is not required as the filter sections need only be adapted to retain the hydrate particles within the store container. One form of securing the filter sections to the container portions is illustrated in the FIGS. 3a and 3b. Specifically, the filter cloth 46 is folded over an end spacer bar 84 and anchored thereto via a plurality of bolts 86.

Referring to FIGS. 4a and 4b, a cross-sectional view of a portion of another hydrate store 88 is shown. These figures particularly illustrate an alternative technique of securing the filter sections of their respective container portions. Firstly, the hydrate store 88 illustrates that a container portion 90 may be provided with a suitable liner 92 which may be operable to both protect the container from corrosion and protect the interior of the store from contamination. With respect to the technique of sealing, an end spacer bar 94 is provided with an inwardly expanding, outwardly opening channel 96 which is adapted to receive the end of a filter cloth wrapped around a resilient, deformable bead 100. During the insertion of the filter section end in bead 100 into the channel 96, the bead 100 will deform and contract to permit the bead and the filter end to be translated past the opening of the channel and become nestingly received within the channel. It will be appreciated that once the bead 100 is received within the channel 96 it will again expand to its normal diameter and operate to retain the end of the filter section 98 within the channel.

Referring to FIG. 5, a plan elevation view, partially in cross-section, of the relief valve 50 shown in FIG. 1 is illustrated. The relief valve 50 generally comprises a housing 102 having an inlet port 104 and one or more outlet ports 106, a ball 108 operably associated with the inlet port 104, and a weighted rod 110 for controlling the position of the ball 108 in response to the pressure at the inlet port 104. When the ball 108 is in its seated position, as shown in FIG. 5, it will sealably engage a seal element 112 preventing any gas or liquid from passing from the inlet port 104 to the outlet port 106. However, when the pressure at the inlet port 104 exceeds the first predetermined pressure the ball 108 will be forced upwardly against the weight of the weighted rod 110 to permit the fluid flow through the outlet port 106. It should be noted that the construction of the relief valve 50 is intended to be exemplary only, and that other suitable relief valve constructions may be employed, such as spring loaded relief valves or electrically operated relief valves. For example, one electrically operated relief valve is exemplified by Model No. DV2-146NCA1, manufactured by the Flourocarbon Company, Anaheim, Calif.

In terms of materials which may be employed for the hydrate stores according to the present invention, it should first be noted that the materials should be chemically resistant or inert to the electrolyte and other chemical entities with which they will come into contact. With respect to the filter section, it is preferred that DuPont Armalon cloth having one of the following model numbers be employed: XT2363, XT2663, E9223-7-1, E9223-17-1, E9223-20. With respect to possible materials for the store container portions and spacer bars, one or more of the following materials may be employed: DuPont teflon, (TFE) polytetraflouroethylene, (FEP) Flouronated Ethylene Propalene copolymer, (PFA) (EPE) Perfluoro alkoxy resin, DuPont Tedlar, (PVF) Polyvinyl Flouride, DuPont Tefyel, (CTFE) Chlorotrifluoroethylene, (Allied) Halar, (ECTFE) Ethylene-Chlorotriflouroethylene, (Pennwalt) Kynar, (PVDF) Polyvinylidine Fluoride, (General Tire & Rubber Corp.) Bolton (PVC) Polyvinylchloride (4008-2124), glass fiber, carbon. With respect to the screen supporting the filter sections, such as screen 78, it is preferred that titanium expanded screen be employed. However, one or more of the above-identified plastic materials may also be employed.

The various embodiments which have been set forth above were for the purpose of illustration and were not intended to limit the invention. It will be appreciated by those skilled in the art that various changes and modifications may be made to these embodiments described in this specification without departing from the spirit and scope of the invention as defined by the appended claims.

I claim:

1. In a metal halogen battery system, including at least one cell having a positive electrode and a negative electrode contacted by aqueous electrolyte containing the material of said metal and halogen, store means whereby a compressible particulate halogen hydrate is formed during the charging of said battery system from the halogen gas liberated at said positive electrode and a chilled liquid, and conduit means for transmitting said halogen gas and said liquid to a hydrate former means for forming said halogen hydrate in association with said store means, said store means being constructed in the form of a container, the improvement comprising:
multiple filter means for separating said halogen hydrate from said liquid, said filter means being constructed in the form of separate sections which combine to substantially cover the interior surface of said container;
exit conduit means in association with said filter means for transmitting the liquid passing through said filter means to said hydrate former means; and
relief valve means interposed in said exit conduit means for controlling the operation of said separate sections of said filter means, such that the liquid flow through said exit conduit means from each of said separate sections is controlled in a predetermined sequence.

2. The invention of claim 1, wherein said separation of said liquid from said halogen hydrate causes an increase in the density of said halogen hydrate by concentrating said halogen hydrate along said filter means.

3. The invention of claim 2, wherein said separate sections of said filter means are spaced a predetermined distance away from the interior surface of said container to provide a space between said filter means and the interior surface of said container.

4. The invention of claim 3, wherein said filter means comprises three separate sections which operate in three discrete stages to provide a substantially uniform liquid flow to said hydrate former means during the charging of said battery system.

5. The invention of claim 4, wherein said three separate sections of said filter means further operate to provide a hydraulically compressive load on said halogen hydrate substantially throughout the charging of said battery system.

6. The invention of claim 5, wherein said store means container is substantially cylindrical in shape, and comprises a generally vertically disposed annular side portion, a generally horizontally disposed circular top portion, and a generally horizontally disposed circular bottom portion, said top and bottom portions being secured to said side wall portion in a sealing relationship.

7. The invention of claim 6, wherein said three separate sections of said filter means comprises a first section substantially covering said side portion of said store means container, a second section substantially covering said top portion, and a third section substantially covering said bottom portion.

8. The invention of claim 7, wherein said exit conduit means includes a first intake conduit portion having an inlet port disposed in the space between said first section of said filter means and said side portion of said store means container, a second intake conduit portion having an inlet port disposed in the space between said second section of said filter means and said top portion of said container, and a third intake conduit portion having an inlet port disposed in the space between said third section of said filter means and said bottom portion of said container.

9. The invention of claim 8, wherein said exit conduit means further includes manifold conduit means for connecting said first, second and third intake portions of said exit conduit means and for collecting the liquid flow therefrom.

10. The invention of claim 9, wherein said relief valve means comprises a first pressure responsive valve interposed in a portion of said manifold conduit means between said first and second intake conduit portions, and a second pressure responsive valve interposed in a portion of said manifold conduit means between said first and third intake conduit portions.

11. The invention of claim 10, wherein said first pressure responsive valve operates to permit liquid flow through said first intake conduit portion above a first predetermined pressure in said store means container, and said second pressure responsive valve operates to permit liquid flow through said third intake conduit portion above a second predetermined pressure in said container.

12. The invention of claim 11, wherein said filter means cooperates with said relief valve means in a first stage to first concentrate said halogen hydrate along said second section of said filter means until the pressure in said store means container rises above said first predetermined pressure.

13. The invention of claim 12, wherein said filter means cooperates with said relief valve means in a second stage to substantially concentrate said halogen hydrate along said first section of said filter means between said first and second predetermined pressures in said store means container.

14. The invention of claim 13, wherein said filter means cooperates with said relief valve means in a third stage to substantially concentrate said halogen hydrate along said third section of said filter means when said pressure in said store means container rises above said second predetermined pressure.

15. The invention of claim 14, wherein said manifold conduit means operates to receive the liquid flow from said first, second and third intake conduit portions and transmit said liquid to said hydrate former means.

16. The invention of claim 15, wherein said store means container is constructed such that a predetermined geometrical relationship exists between the magnitude of the height of said side portion and the magnitude of the diameter of said top and bottom portions of said container.

17. The invention of claim 16, wherein said liquid comprises said electrolyte of said battery system.

18. In a zinc-chloride battery system, including at least one cell having a positive electrode and a negative electrode contacted by aqueous zinc-chloride electrolyte, store means whereby a compressible particulate chlorine hydrate is formed during the charging of said battery system from the chlorine gas liberated at said positive electrode and a chilled liquid, and conduit means for transmitting said chlorine gas and said liquid to a hydrate former means for forming said chloride hydrate in association with said store means, said store means being constructed in the form of a container, the improvement comprising:
   multiple filter means for separating said chlorine hydrate from said liquid, said filter means being constructed in the form of separate sections which combine to substantially cover the interior surface of said container;
   exit conduit means in association with said filter means for transmitting the liquid passing through said filter means to said hydrate former means; and
   relief valve means interposed in said exit conduit means for controlling the operation of said separate sections of said filter means, such that the liquid flow through said exit conduit means from each of said separate sections is controlled in a predetermined sequence.

19. The invention of claim 18, wherein said separation of said liquid from said chlorine hydrate causes an increase in the density of said chlorine hydrate by concentrating said chlorine hydrate along said filter means.

20. The invention of claim 19, wherein said separate sections of said filter means are spaced a predetermined distance away from the interior surface of said container to provide a space between said filter means and the interior surface of said container.

21. The invention of claim 20, wherein said filter means comprises three separate sections which operate in three discrete stages to provide a substantially uniform liquid flow to said hydrate former means during the charging of said battery system.

22. The invention of claim 21, wherein said three separate sections of said filter means further operate to provide a hydraulically compressive load on said chlorine hydrate substantially throughout the charging of said battery system.

23. The invention of claim 22, wherein said store means container is substantially cylindrical in shape, and comprises a generally vertically disposed annular side portion, a generally horizontally disposed circular top portion, and a generally horizontally disposed circular bottom portion, said top and bottom portions being secured to said side portion in a sealing relationship.

24. The invention of claim 23, wherein said three separate sections of said filter means comprises a first section substantially covering said side portion of said store means container, a second section substantially covering said top portion, and a third section substantially covering said bottom portion.

25. The invention of claim 24, wherein said exit conduit means includes a first intake conduit portion having an inlet port disposed in the space between said first section of said filter means and said side portion of said store means container, a second intake conduit portion having an inlet port disposed in the space between said second section of said filter means and said top portion of said container, and a third intake conduit portion having an inlet port disposed in the space between said third section of said filter means and said bottom portion of said container.

26. The invention of claim 25, wherein said exit conduit means further includes manifold conduit means for connecting said first, second and third intake portions of said exit conduit means and for collecting the liquid flow therefrom.

27. The invention of claim 26, wherein said relief valve means comprises a first pressure responsive valve interposed in a portion of said manifold conduit means between said first and second intake conduit portions, and a second pressure responsive valve interposed in a portion of said manifold conduit means between said first and third intake conduit portions.

28. The invention of claim 27, wherein said first pressure responsive valve operates to permit liquid flow through said first intake conduit portion above a first predetermined pressure in said store means container, and said second pressure responsive valve operates to permit liquid flow through said third intake conduit portion above a second predetermined pressure in said container.

29. The invention of claim 28, wherein said filter means cooperates with said relief valve means in a first stage of first concentrate said chlorine hydrate along said second section of said filter means until the pressure in said store means container rises above said first predetermined pressure.

30. The invention of claim 29, wherein said filter means cooperates with said relief valve means in a second stage to substantially concentrate said chlorine hydrate along said first section of said filter means between said first and second predetermined pressures in said store means container.

31. The invention of claim 30, wherein said filter means cooperates with said relief valve means in a third stage to substantially concentrate said chlorine hydrate along said third section of said filter means when said pressure in said store means container rises above said second predetermined pressure.

32. The invention of claim 31, wherein said manifold conduit means operates to receive the liquid flow from said first, second and third intake conduit portions and transmit said liquid to said hydrate former means.

33. The invention of claim 32, wherein said store means container is constructed such that a predetermined geometrical relationship exists between the magnitude of the height of said side portion and the magnitude of the diameter of said top and bottom portions of said container.

34. The invention of claim 33, wherein said liquid comprises said electrolyte of said battery system.

35. In a zinc-chloride battery system adapted to provide electrical power during the discharging of said battery system for an electrically powered vehicle, said battery system including a plurality of cells each having a positive electrode and a negative electrode contacted by aqueous zinc-chloride electrolyte, store means whereby a compressible particulate chlorine hydrate is formed during the charging of said battery system from the chlorine gas liberated at said positive electrodes and a portion of said electrolyte, means for circulating electrolyte through said cells, and conduit means for transmitting said halogen gas and said electrolyte to a hydrate former means for forming said chlorine hydrate in association with said store means, said store means being constructed in the form of a container, the improvement comprising:
  multiple filter means for separating said chlorine hydrate from said electrolyte, said filter means being constructed in the form of three separate sections which combine to substantially cover the interior surface of said container;
  exit conduit means in association with said filter means for transmitting the electrolyte passing through said filter means from said store means to said hydrate former means; and
  relief valve means interposed in said exit conduit means for controlling the operation of said separate sections of said filter means, such that the electrolyte flow through said exit conduit means from each of said separate sections is controlled in a predetermined sequence.

36. The invention of claim 35, wherein said separation of said electrolyte from said chlorine hydrate causes an increase in the density of said halogen hydrate by concentrating said chlorine hydrate along said filter means.

37. The invention of claim 36, wherein said separate sections of said filter means are spaced a predetermined distance away from the interior surface of said container to provide a space between said filter means and the interior surface of said container.

38. The invention of claim 37, wherein said three separate sections operate in three discrete stages to provide a substantially uniform electrolyte flow to said hydrate former means during the charging of said battery system.

39. The invention of claim 38, wherein said three separate sections of said filter means further operate to provide a hydraulically compressive load on said chlorine hydrate substantially throughout the charging of said battery system.

40. The invention of claim 39, wherein said store means container is substantially cylindrical in shape, and comprises a generally vertically disposed annular side portion, a generally horizontally disposed circular top portion, and a generally horizontally disposed circular bottom portion, said top and bottom portions being secured to said side portion in a sealing relationship.

41. The invention of claim 40, wherein said three separate sections of said filter means comprises a first section substantially covering said side portion of said store means container, a second section substantially covering said top portion, and a third section substantially covering said bottom portion.

42. The invention of claim 41, wherein said exit conduit means includes a first intake conduit portion having an inlet port disposed in the space between said first section of said filter means and said side portion of said store means container, a second intake conduit portion having an inlet port disposed in the space between said second section of said filter means and said top portion of said container, and a third intake conduit portion having an inlet port disposed in the space between said third section of said filter means and said bottom portion of said container.

43. The invention of claim 42, wherein said exit conduit means further includes manifold conduit means for connecting said first, second and third intake portions of said exit conduit means and for collecting the electrolyte flow therefrom.

44. The invention of claim 43, wherein said relief valve means comprises a first pressure responsive valve interposed in a portion of said manifold conduit means between said first and second intake conduit portions, and a second pressure responsive valve interposed in a portion of said manifold conduit means between said first and third intake conduit portions.

45. The invention of claim 44, wherein said first pressure responsive valve operates to permit electrolyte flow through said first intake conduit portion above a first predetermined pressure in said store means container, and said second pressure responsive valve operates to permit electrolyte flow through said third intake conduit portion above a second predetermined pressure in said container.

46. The invention of claim 45, wherein said filter means cooperates with said relief valve means in a first stage to first concentrate said chlorine hydrate along said second section of said filter means until the pressure in said store means container rises above said first predetermined pressure.

47. The invention of claim 46, wherein said filter means cooperates with said relief valve means in a second stage to substantially concentrate said chlorine hydrate along said first section of said filter means between said first and second predetermined pressures in said store means container.

48. The invention of claim 47, wherein said filter means cooperates with said relief valve means in a third stage to substantially concentrate said chlorine hydrate along said third section of said filter means when said pressure in said store means container rises above said second predetermined pressure.

49. The invention of claim 48, wherein said manifold conduit means operates to receive the electrolyte flow from said first, second and third intake conduit portions and transmit said electrolyte to said hydrate former means.

50. The invention of claim 49, wherein said store means container is constructed such that a predetermined geometrical relationship exists between the magnitude of the height of said side portion and the magnitude of the diameter of said top and bottom portions of said container.

* * * * *